United States Patent [19]
Daffara et al.

[11] Patent Number: 5,987,122
[45] Date of Patent: Nov. 16, 1999

[54] PORTABLE PHONE WITH COVER ACTUATING HINGE ASSEMBLY

[75] Inventors: Michael H. Daffara, Ramona; Roger Bishop, Encinitas, both of Calif.

[73] Assignee: Qualcomm Incorporated, San Diego, Calif.

[21] Appl. No.: 09/003,999

[22] Filed: Jan. 8, 1998

[51] Int. Cl.$^6$ .................................................... H04M 1/00
[52] U.S. Cl. ........................................... 379/433; 379/434
[58] Field of Search ..................... 379/428, 433, 379/434; 455/575; 16/254–256, 277, 278, 284, 287–288, 319, 293, 295, 303, 307

[56] References Cited

U.S. PATENT DOCUMENTS

| | | | |
|---|---|---|---|
| 5,628,089 | 5/1997 | Wilcox | 379/433 |
| 5,649,309 | 7/1997 | Wilcox et al. | 455/90 |

*Primary Examiner*—Jack Chiang
*Attorney, Agent, or Firm*—Russell B. Miller; Roger W. Martin; Charles D. Brown

[57] ABSTRACT

A hinge assembly rotatably connects one end of a cover to a phone body for rotation about a hinge axis between a closed position and an open position. The hinge assembly has a first part secured to the phone body, a second part rotatably secured to the first hinge part and rigidly secured to the cover, and a hinge release shaft secured against rotation relative to the first hinge part and extending into the second hinge part. The release shaft and second hinge part have interengageable latch formations for preventing rotation between the hinge parts when the cover is in the closed position. The release shaft is movable between an extended position in which latch formations engage and a retracted position in which the latch formations are released. A spring part rotates the cover into the open position when the latch is released. A manual override of the latch is provided.

21 Claims, 2 Drawing Sheets

PORTABLE PHONE WITH COVER ACTUATING HINGE ASSEMBLY

BACKGROUND OF THE INVENTION

The present invention is directed generally to clamshell style portable phones or wireless communication devices having a housing or body in which at least part of the communication electronics is mounted and a cover hinged to the body for movement between a closed position folded against the body and covering at least part of a keypad on the body and an open position in which the keypad is uncovered for use. The invention is particularly concerned with a cover releasing and actuating hinge assembly for releasing the cover from a closed position and automatically urging the cover into an open position when released.

Some clamshell style portable phones have lids secured by a hinge assembly incorporating a torsion spring for moving the cover from the closed position to the open position. A latch must then be provided to secure the cover against the body in the closed position. The user must release the latch in order to open the cover.

U.S. Pat. No. 5,649,309 of Wilcox et al. describes a portable telephone with an axially aligned cover release mechanism. The mechanism includes a release and position mechanism on one side of the hinge and an opening mechanism on the other side of the hinge. A cam and follower device includes stops at the closed and open positions of the cover, and a push button is provided for shifting the cam such that it clears the follower to allow the cover to spring open. This cover release mechanism is relatively complex and involves a large number of different parts.

SUMMARY OF THE INVENTION

It is an object of the present invention to provide a new and improved releasing and actuating hinge assembly for a portable phone.

According to the present invention, a portable phone is provided which comprises a housing or body, a cover, and a hinge assembly rotatably securing the cover to the body, the hinge assembly having a first part secured to the housing and a second part secured to the cover and rotatably mounted relative to the first part, a biasing mechanism secured between the first and second parts to bias the cover into an open position at an obtuse angle to the housing, the second part having a through bore, the through bore having a latch device, and a hinge release shaft secured against rotation relative to the first part and extending axially through the bore in the second part, a second biasing device urging the hinge release shaft towards the second part, and the latch device and hinge release shaft having interengageable latch formations for releasably securing the second part to the first part to prevent rotation of the second part relative to the first part, one of the latch formations comprising a notch and the other latch formation comprising a tab for engagement in the notch, the hinge release shaft having an outer end projecting out of the second part and comprising a push button for movement between an outer position in which the tab engages in the notch and an inner position in which the tab is released from the notch. Preferably, a pair of spaced stops are provided to limit rotation of the cover and second part of the hinge assembly between a pair of end positions corresponding to the closed position of the cover and a predetermined open position of the cover.

The hinge assembly will hold the cover in the closed position when the latch tab is engaged in the notch. When a user wishes to open the cover, the push button is simply pressed to release the tab from the notch, at which point the biasing mechanism, preferably a torsion spring, urges the second part and cover to rotate into the open position, as determined by the stop in the second hinge part. In order to close the cover, the user simply pushes the cover down against the phone housing. Once the tab is again in a position aligned with the notch, the release shaft is biased to the outer or extended position such that the tab engages in the notch, holding the cover closed. Preferably, the tab is provided on the shaft and the notch is provided on the second hinge part. The second hinge part may also be provided with a pair of angularly spaced stop surfaces aligned with the tab when the shaft is in the retracted or inner position, such that the tab will engage one stop surface when the second part is rotated into the cover open position, and will engage the other stop surface when the cover is rotated back into the closed position.

In this invention, the push button release and the latch are both provided by a single, axially movable hinge release shaft, making the mechanism simple and easy to operate. The latch formations are preferably designed such that they can be manually overridden without depressing the push button, to avoid the risk of excessive force breaking the latch tab off. At the same time, the cover is securely held in either the open or closed position, and readily movable to the opposite position when desired, simply by depressing a push button release when the cover is closed or by applying sufficient force to overcome the spring force when the cover is open.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 1:
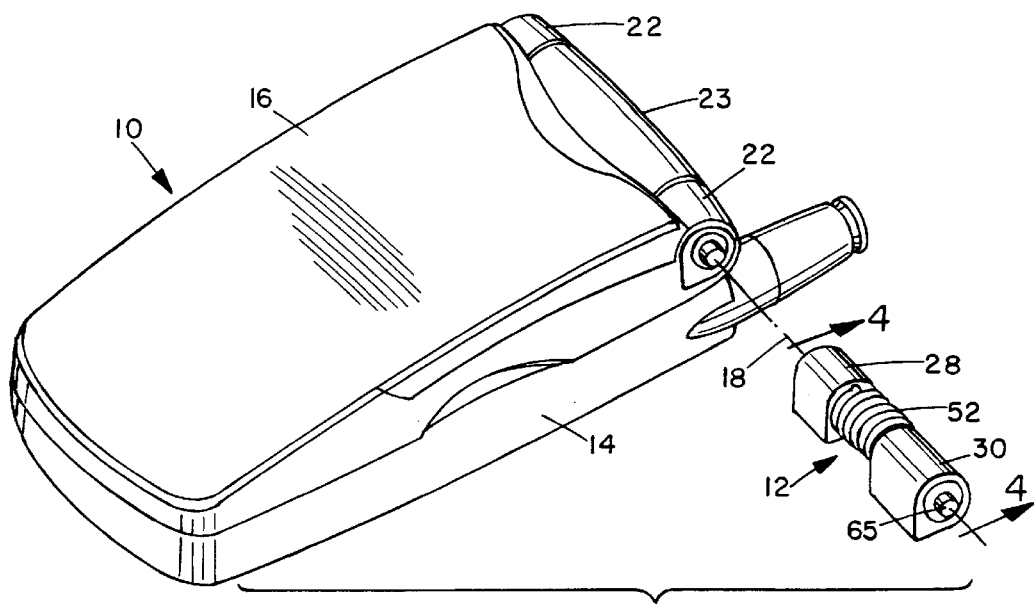
FIG. 1 is a perspective of a clamshell type phone with a hinge assembly according to a preferred embodiment of the invention shown separated from the phone.
Figure 2:
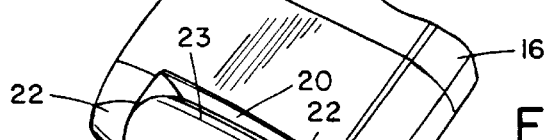
FIG. 2 is a partial perspective view with the cover opened.
Figure 8:
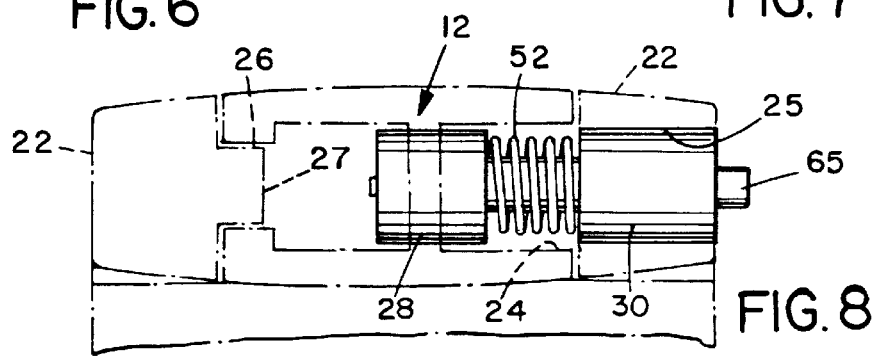
FIG. 8 illustrates the installation of the hinge module in the phone structure, portions of which are indicated in broken line.

FIGS. 1 and 2 of the drawings illustrate a clamshell style portable phone 10 with a hinge assembly 12 according to a preferred embodiment of the invention shown separate from the phone in FIG. 1, while FIG. 8 illustrates the installation of the assembly 12 in the phone. The hinge assembly 12 is illustrated in more detail in FIGS. 3 to 5.

The portable phone 10 comprises a base or housing 14 and a cover 16 rotatably secured to the housing 14 by means of the hinge assembly 12 for rotation about a hinge axis 18 between a closed position as illustrated in FIG. 1 in which the cover is folded against the top of the housing, and an open position as illustrated in FIG. 2 in which the cover is at a predetermined obtuse angle relative to the housing. In some portable phones, the electronic components including the ear piece and speaker will all be mounted in the base or housing, while in other phones the speaker will be in the base and the ear piece in the cover. This invention is applicable to either type of portable phone.

Figures 6, 7:
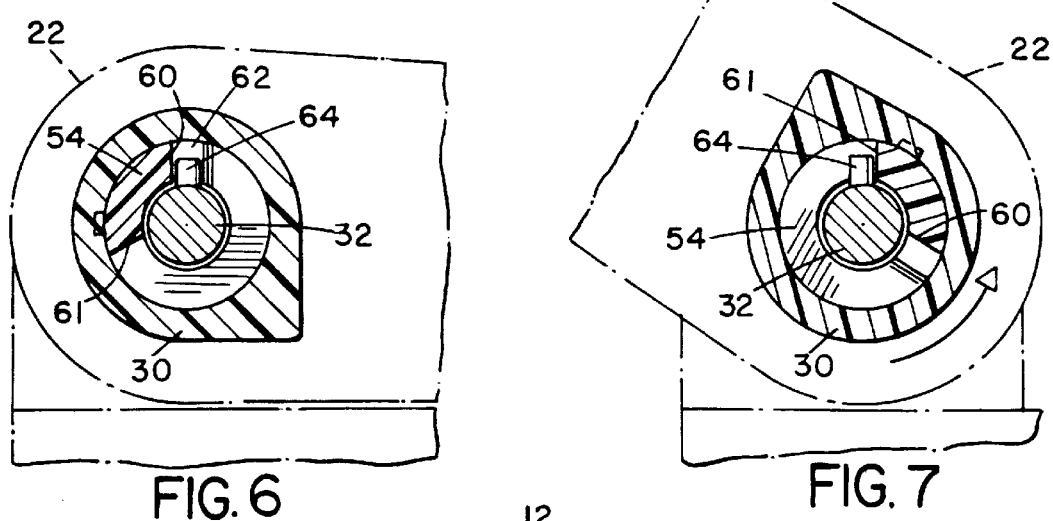
FIG. 6 is a sectional view taken on line 6—6 of FIG. 4 with the cover closed.
FIG. 7 is a view similar to FIG. 6, with the cover opened.

As illustrated in FIGS. 1 and 2, the cover 16 is provided with a recess 20 at one end with an ear or knuckle 22 at each end of the recess, while the base or housing 14 is provided with a pivot housing 23 for engagement between the ears 22. The pivot housing 23 and one ear 22 of the cover have aligned bores or chambers 24,25, respectively, in which the pivot assembly is mounted, as best illustrated in FIGS. 6 to 8. The opposite ear 22 has a boss 27 which is rotatably mounted in an opening 26 at the opposite end of the pivot housing chamber 24, as illustrated in FIG. 8.

Figure 3:
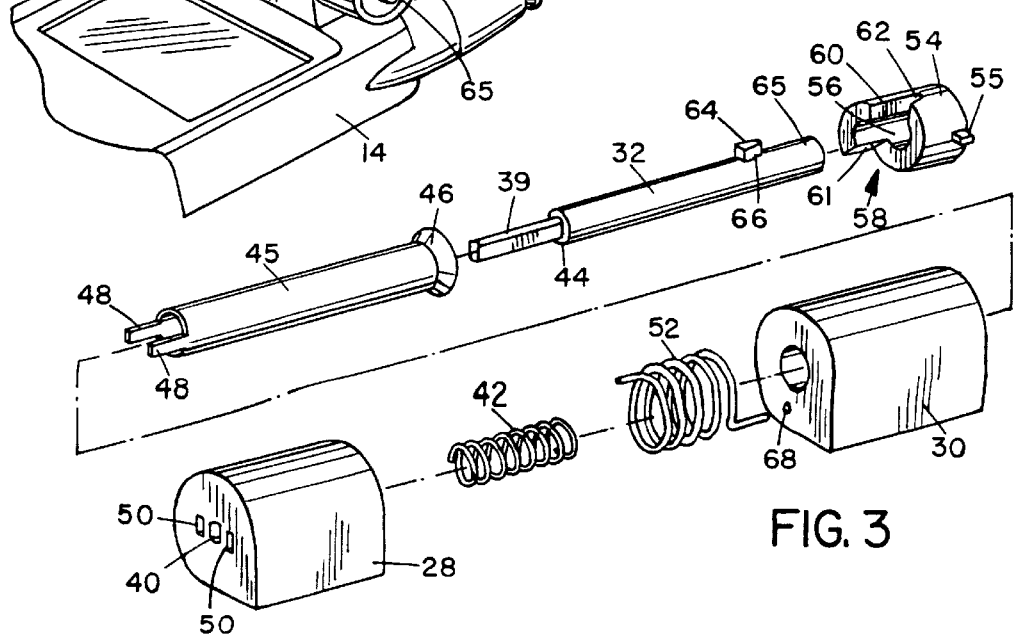
FIG. 3 is an exploded perspective view of the hinge components.
Figure 4:
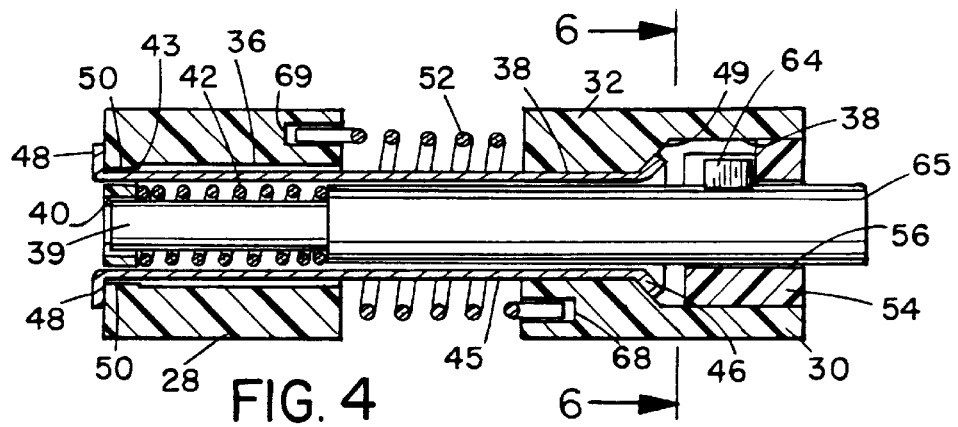
FIG. 4 is an enlarged sectional view taken on line 4—4 of FIG. 1.
Figure 5:
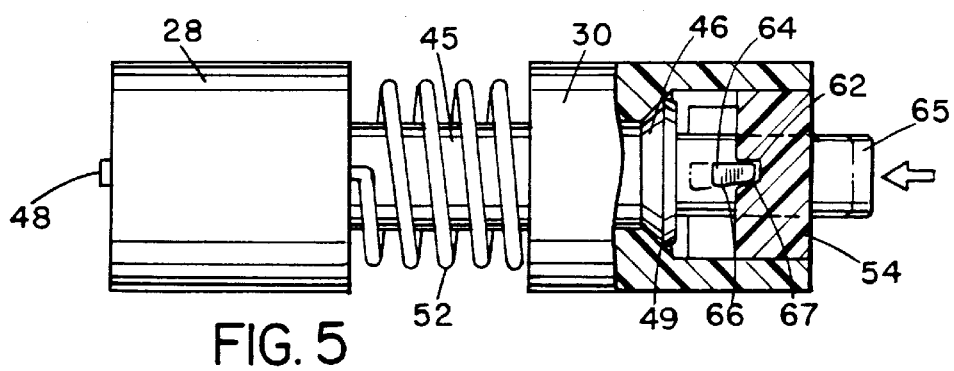
FIG. 5 is a top plan view of the structure of FIG. 4, partially cut away to show the lock mechanism.

As best illustrated in FIGS. 3 to 5, the hinge assembly 12 basically comprises a first part or end member 28 which is adapted to be secured in the chamber 24 in the phone pivot housing 23, a second part or end member 30 which is adapted to be secured in the through bore 25 of cover ear 22, as best illustrated in FIGS. 6 to 8, and a hinge release shaft 32 extending co-axially with the hinge axis 18 between the two parts. The first part 28 is preferably a press fit in the pivot housing or may be secured by any suitable fastener mechanism, such as screws, rivets, or adhesive. The second part 30 is preferably also a press fit in ear 22, or may alternatively be secured by any other suitable fastener mechanism. As best illustrated in FIG. 3, each hinge part 28,30 has an outer surface of non-circular cross-section, and the recesses or chambers 24,25 in the pivot housing and ear are of corresponding non-circular cross-section, in order to resist rotation of the hinge part relative to the chamber in which it is mounted. The hinge parts are generally teardrop shaped in cross-section for keying purposes in the illustrated embodiment, although other non-circular cross-sectional shapes are possible, such as D-shapes and the like.

Parts 28 and 30 have aligned bores 36,38, respectively into which the opposite ends of the hinge release shaft project, as best illustrated in FIG. 4. Shaft 32 has an end portion 39 of non-circular cross section which engages in a correspondingly shaped counterbore 40 at the inner end of bore 36 to prevent rotation of the shaft relative to part 28, while permitting some axial motion of the shaft. A compression spring 42 around end portion 39 acts between the end wall 43 of bore 36 and a shoulder 44 on the shaft to bias the shaft towards the hinge part 30.

As best illustrated in FIG. 4, the second hinge part 30 is rotatably secured to the first part 28 by means of a connector sleeve 45 having a flared, outwardly projecting rim or skirt 46 at one end and a pair of outwardly projecting tabs 48 at the opposite end. The sleeve extends over shaft 32 with the skirt 42 engaging a shoulder 49 in the through bore 38 in part 30, and into the bore 36. A pair of slots 50 extend from the outer end of hinge part 28 and into bore 36 for receiving the tabs 48. The tabs 48 are then bent over as illustrated in FIG. 4 to rotatably secure the hinge part 30 to hinge part 28, resisting axial movement of part 30 relative to part 28.

A torsion spring 52 is connected between openings 69,68, respectively, in the inner end walls of hinge parts 28 and 30, as best illustrated in FIGS. 4 and 5, so as to urge the hinge part 30 and attached cover 16 to rotate between the closed position of FIGS. 1 and 6 and the open position of FIGS. 2 and 7. However, rotation of the hinge part 30 and cover is restricted by a latch or locking insert 54 inside the bore in part 30. Latch insert 54 is secured in bore 38 by means of a fastener tab 55 or any other suitable fastener mechanism. Insert 54 has a through bore 56 through which the hinge release shaft 32 projects. The inner rim of the insert 54 facing shaft 32 is provided with a cut out or recessed region 58 having a pair of spaced, axially extending flat faces or stops 60,61, and a notch 62 comprising a first latch formation. The shaft 32 has a radially projecting latch tab 64 for releasable latching or locking engagement in notch 62 when the cover is closed and the shaft is in the extended position illustrated in FIGS. 4 and 5. The arrangement is such that, in the closed position or orientation of the cover and attached hinge part 30, the tab 64 is axially aligned with notch 62 and is thus urged into notch 62 by compression spring 42, as indicated in FIGS. 4 and 5.

When the user wishes to open the cover 16 of the phone, the projecting end 65 of the shaft, which acts as a push button release or an external button secured to the end of shaft 65, is depressed in the direction of the arrow in FIG. 5. This moves the shaft 32 from the extended position illustrated in solid outline to a retracted position as illustrated in dotted outline, simultaneously moving latch tab 64 out of the latch notch or indent 62 and compressing spring 42. At this point, torsion spring 52 will urge the hinge part 30 and attached cover to rotate in the direction of the arrow in FIG. 7 until the stop face 61 on insert 54 reaches the tab 64, preventing further rotation of the cover. Instead of internal stops in the hinge part 30 as in the illustrated embodiment, stops may instead be provided on the outer surface of the phone housing for engaging the cover in the open and closed positions. In this case, the latch need only be provided with a notch or indent for receiving the latch tab 64, simplifying the internal construction.

The cover will be held open by torsion spring 52 until the user wishes to close it. At this time, the cover is pushed back in the opposite direction, simultaneously rotating the hinge part 30 and insert 54 back from the position illustrated in FIG. 7 to that of FIG. 6. The rotation is stopped when the opposite stop face 60 contacts tab 64. At this point, tab 64 will be axially aligned with notch 62 and will be urged into latching engagement with notch 62 by compression spring 42. The cover is then held in the closed position by the latch mechanism until released by again depressing the push button or shaft end 65.

Preferably, mating side edges 66,67 of the latch tab 64 and notch 62 are tapered or radiused, as best indicated in FIGS. 3 and 5. If the user should attempt to override the latch and push the cover open without depressing the push button end 65 of the shaft, the tapering edges will permit the cover to be forced open without damaging the latch tab 64.

Assembly of the various parts illustrated in FIG. 3 into the modular assembly illustrated in FIGS. 1,4 and 5 is relatively simple. The second hinge part 30 is moved down the sleeve 45 from the tabbed end until the shoulder 49 meets the flared skirt 46 at the end of the sleeve. The torsion spring 52 is then moved down over sleeve 45 until the spring end can be inserted in the opening 68 provided for that purpose in hinge part 30. The hinge release shaft 32 is then inserted into the sleeve 45. The locking or latch insert 54 is then pressed into the open end of hinge part 30. The compression spring 42 is installed over the end portion 39 of the hinge release shaft 32. Finally, the first, stationary hinge part 28 is installed over the sleeve, making sure counterbore 40 is properly aligned with the shaft end portion 39 and the slots 50 are aligned with sleeve tabs 48. The opposite spring end is then inserted in opening 69. When the sleeve tabs 48 project out of the slots 50 as far as possible, they are bent down to hold the assembly together. The assembly can then be installed as a unit in the hinge housing 23 with the hinge part 30 projecting out at one end for mating engagement in one of the cover ears 22.

The internal stop face 61 automatically stops the cover 16 at an optimum obtuse angle, preferably around 150°, relative to the base or housing 14, corresponding to a desired orientation relative to a user's mouth and ear during phone use. As mentioned above, the internal stop face may alternatively be replaced with an external stop face on the phone housing itself for engagement with a portion of the cover when in the desired orientation.

The hinge assembly as described above is simple to operate, requiring only a simple depression of a push button to release a latch, at which point the cover is automatically urged into an open position without requiring any manual opening by the user. At the same time, the user still has the option of manually pulling up the cover, which will overcome the force of spring 42 and urge tab 64 out of latch notch 62. The assembly is simple and inexpensive to manufacture and install in any type of portable phone, and has a relatively small number of parts, reducing the risk of malfunction or failure of the assembly.

Although a preferred embodiment of the invention has been described above by way of example only, it will be understood by those skilled in the field that modifications may be made to the disclosed embodiment without departing from the scope of the present invention, which is defined by the appended claims.

I claim:

1. A portable phone, comprising:

a housing;

a cover having opposite first and second ends;

a hinge assembly rotatably securing the first end of the cover to the housing for rotation about a hinge axis between a closed position folded against the body and an open position at a predetermined angle to the body;

the hinge assembly comprising a first part secured to the housing, a second part aligned with the first part along the hinge axis and secured to the cover, and a hinge release shaft extending along the hinge axis between the first and second parts;

the hinge release shaft being secured against rotation relative to the first part and being axially movable relative to the second part between a first, extended position and a second, retracted position;

the hinge release shaft and second part having interengageable latch formations, one of the latch formations comprising a notch and the other latch formation comprising a tab, the tab engaging the notch in the extended position to prevent rotation of the second part and cover, and the tab being released from the notch in the retracted position to permit rotation of the cover; and a biasing mechanism between the first and second hinge parts biasing the second hinge part and cover towards the open position when the latch tab is released from the notch.

2. The phone as claimed in claim 1, further including at least one stop for preventing rotation of the cover beyond an open position at a predetermined angle to the phone housing.

3. The phone as claimed in claim 1, further including a manually operable push button for moving the hinge release shaft from the extended position to the retracted position.

4. The phone as claimed in claim 3, wherein the second hinge part has a through bore, the through bore having a first said latch formation, the hinge release shaft projecting through said bore and having an end portion projecting out of said bore at least in said extended position, the end portion comprising said push button.

5. The assembly as claimed in claim 4, wherein said first latch formation comprises said notch and the other said latch formation comprises a radially outwardly projecting tab on said shaft for releasable latching engagement in said notch when said shaft is in the extended position.

6. The assembly as claimed in claim 5, including a compression spring acting between said first hinge part and said shaft to bias said shaft into said extended position.

7. The assembly as claimed in claim 6, including an override mechanism for moving said tab out of said notch without manual depression of said push button.

8. The assembly as claimed in claim 7, wherein said notch has a radiused side edge and the tab has a corresponding tapered edge, whereby said tapered edge rides up over said radiused side edge of said notch if said cover is manually urged towards an open position without depressing said push button.

9. The assembly as claimed in claim 5, wherein said through bore has a pair of angularly spaced stop surfaces for engagement with said tab in the open and closed positions of said cover to restrict rotation of said second hinge part beyond the respective open and closed positions.

10. The assembly as claimed in claim 1, including a connecting sleeve rotatably connecting the second hinge part to the first hinge part.

11. The assembly as claimed in claim 10, wherein the second hinge part has a through bore having an internal shoulder facing away from said first hinge part, said sleeve having a first end connected to said first hinge part and a second end having an outwardly flared skirt portion engaging said internal shoulder to restrict relative axial movement of said hinge parts while permitting said second hinge part to rotate relative to said first hinge part.

12. The assembly as claimed in claim 1, wherein said phone housing has a hinge chamber at one end having opposite ends, and said cover has a recess at one end and an ear at each end of said recess for fitting over said hinge chamber, one of said ears having a bore aligned with said chamber on said hinge axis, the first hinge part being secured in said chamber and the second hinge part being secured in said bore in said cover ear.

13. The assembly as claimed in claim 1, wherein said biasing mechanism comprises a torsion spring.

14. A portable phone assembly, comprising:

a phone body;

a cover having opposite ends;

a hinge assembly rotatably connecting one end of the cover to the phone body for rotation about a hinge axis between a closed position extending over at least part of the phone body and an open position at a predetermined angle relative to the phone body;

the hinge assembly having a first hinge part secured to the phone body, a second hinge part rotatably secured to the first hinge part and rigidly secured to said one end of the cover, and a hinge release shaft secured against rotation relative to said first hinge part and extending into said second hinge part;

the hinge release shaft and second hinge part having interengageable latch formations for preventing rotation of the second hinge part relative to the first hinge part when the cover is in the closed position, one of the latch formations comprising a notch and the other latch formation comprising a tab for latching engagement in the notch;

the hinge release shaft being movable between an extended position in which said tab is in latching engagement with said notch and a retracted position in which said tab is released from said notch;

a first biasing device biasing said hinge release shaft towards said extended position; and a second biasing device biasing said second hinge part and cover into said open position of said cover, whereby said cover is automatically rotated into said open position when said tab is released from said notch.

15. The assembly as claimed in claim 14, wherein said tab is provided on said hinge release shaft and said second hinge part has a through bore through which said hinge release shaft projects, the through bore having a notch facing and aligned with said tab in the closed position of said cover.

16. The assembly as claimed in claim 14, wherein said second biasing device comprises a torsion spring connected between said first and second hinge parts.

17. The assembly as claimed in claim 14, wherein said first and second hinge parts have aligned first and second bores, respectively, said hinge release shaft having a first end projecting into said first bore and a second end projecting through said second bore and out of said second hinge part, said first bore having an anti-rotation portion for sliding engagement with a corresponding portion of said hinge release shaft for preventing rotation of said shaft relative to said first hinge part.

18. The assembly as claimed in claim 17, wherein said first bore has an internal shoulder and said shaft has an external shoulder facing said first bore shoulder, and said first biasing means comprises a compression spring mounted over the shaft and extending between said shaft shoulder and said bore internals shoulder to bias said shaft away from said first hinge part.

19. The assembly as claimed in claim 14, including a push button for manually pushing said shaft into said retracted position.

20. The assembly as claimed in claim 19, wherein said second hinge part has an inner end, and outer end, and a through bore extending between said ends, said shaft having an end portion projecting through said through bore and out of the outer end of said second hinge part, said end portion having an outer end comprising said push button.

21. A hinge assembly for rotatably connecting a cover to a phone body for rotation about a hinge axis between a closed position extending over at least part of the phone body and an open position at a predetermined angle relative to the phone body, the assembly comprising:

a first hinge part adapted to be secured in a recess in a phone body;

a second hinge part rotatably secured to the first hinge part and adapted to be rigidly secured to one end of a phone cover;

a hinge release shaft secured against rotation relative to said first hinge part and extending into said second hinge part, the shaft being axially movable relative to said first and second hinge parts between an extended position and a retracted position;

the hinge release shaft and second hinge part having interengageable latch formations for preventing rotation of the second hinge part relative to the first hinge part when the cover is in the closed position, one of the latch formations comprising a notch and the other latch formation comprising a tab for latching engagement in the notch, said tab being in latching engagement with said notch when said shaft is in the extended position and released from said notch when said shaft is in the retracted position;

a first biasing device biasing said hinge release shaft towards said extended position; and a second biasing device biasing said second hinge part to rotate relative to said first hinge part, whereby a phone cover attached to said second hinge part is automatically rotated into said open position when said tab is released from said notch.

* * * * *